(12) United States Patent
Duckert

(10) Patent No.: US 9,102,255 B2
(45) Date of Patent: Aug. 11, 2015

(54) HEADREST ASSEMBLY FOR AN AIRCRAFT SEAT

(71) Applicant: AMI Industries, Colorado Springs, CO (US)

(72) Inventor: Robert Duckert, Coleman, WI (US)

(73) Assignee: AMI INDUSTRIES, Colorado Springs, CO (US)

( * ) Notice: Subject to any disclaimer, the term of this patent is extended or adjusted under 35 U.S.C. 154(b) by 22 days.

(21) Appl. No.: 14/046,275

(22) Filed: Oct. 4, 2013

(65) Prior Publication Data

US 2015/0097407 A1    Apr. 9, 2015

(51) Int. Cl.
*A47C 1/10* (2006.01)
*B60N 2/48* (2006.01)
*B64D 11/06* (2006.01)

(52) U.S. Cl.
CPC . *B60N 2/48* (2013.01); *B64D 11/06* (2013.01)

(58) Field of Classification Search
CPC ............................. B60N 2/4817; B60N 2/4814
USPC .................................................. 297/410, 391
See application file for complete search history.

(56) References Cited

U.S. PATENT DOCUMENTS

| 4,351,563 | A  | * | 9/1982  | Hattori ........................ 297/408 |
| 5,816,658 | A  | * | 10/1998 | Wallis ......................... 297/410 |
| 6,022,078 | A  | * | 2/2000  | Chang .......................... 297/391 |
| 7,621,598 | B2 | * | 11/2009 | Humer et al. ................. 297/410 |
| 8,376,466 | B2 |   | 2/2013  | Kladde |
| 8,517,311 | B2 |   | 8/2013  | Marini |
| 8,585,146 | B1 |   | 11/2013 | Giasson et al. |
| 8,672,399 | B2 |   | 3/2014  | Brunner et al. |
| 8,721,001 | B2 | * | 5/2014  | Li et al. ........................ 297/410 |
| 2008/0048479 | A1 | * | 2/2008 | Yoshida et al. ............... 297/410 |

* cited by examiner

*Primary Examiner* — Laurie Cranmer
(74) *Attorney, Agent, or Firm* — Cantor Colburn LLP

(57) ABSTRACT

A headrest assembly for an aircraft seat includes a headrest frame having a body portion, a top member interconnected with the headrest frame, a spring clip member interconnected with the top member, a bracket member with a locking rivet, and a headrest tube having a longitudinal slot. The top member includes a plurality of elongated slots and the bracket member is coupled to the headrest frame. The headrest tube is configured to receive the locking rivet in the longitudinal slot in a locked position and thereby lock the headrest tube to the headrest frame.

11 Claims, 6 Drawing Sheets

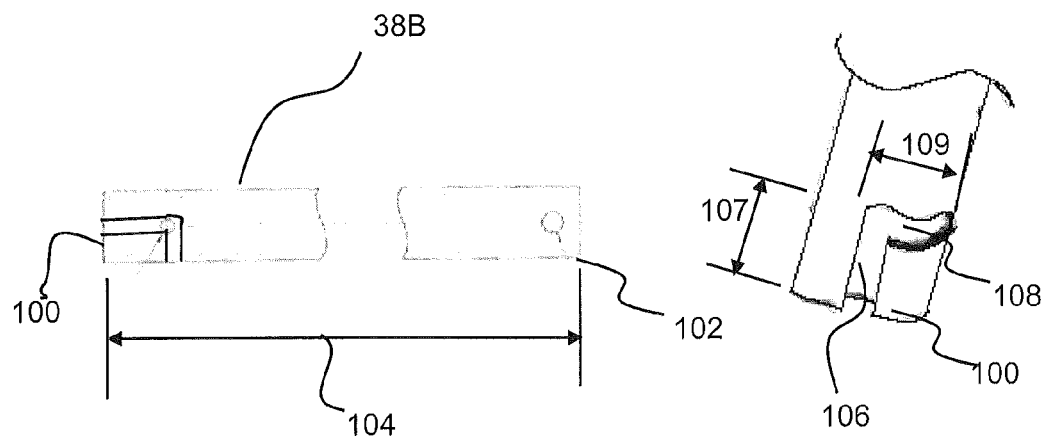
*FIG. 5A*  *FIG. 5B*
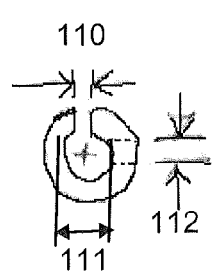  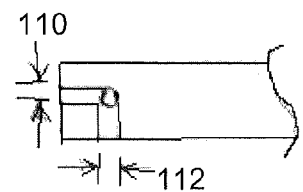
*FIG. 5C*  *FIG. 5D*

HEADREST ASSEMBLY FOR AN AIRCRAFT SEAT

BACKGROUND

The subject matter disclosed herein relates generally to the field of aircraft interiors and, more particularly, to a headrest assembly for an aircraft seat that includes selectively coupled headrest tubes and a method of selectively coupling headrest tubes to a headrest assembly after upholstering.

DESCRIPTION OF RELATED ART

Some commercial aircraft seats include a headrest that is designed for a minimum length of back support and personal comfort. As such, the headrest may be selectively moved up and down to adjust for the sitting height of the person occupying the seat. Also, the headrest may include wing portions that extend from each side of the headrest in order to provide additional support if the seat occupant wanted to lean their head to one side or the other. In some cases, the headrest may be assembled independently of the seat back. Assembling the headrest includes riveting a headrest frame to wing members, brackets, and a headrest tube and upholstering the assembled headrest frame with a foam and fabric, e.g., leather or cloth. If leather is upholstered, a leather dye lot requires a burn test prior to upholstering in order to verify compliance to FAA regulations. However, occasionally during shipment, some of the upholstered headrest tubes are accidentally scratched, chipped, or otherwise damaged and may have to be replaced. Replacement of the damaged headrest tube is time consuming and expensive and includes removing and discarding the fabric and foam and grinding off the rivets holding the damaged tubes to the headrest frame. Once new headrest tubes are installed, the assembled headrest frame is re-upholstered with new foam and leather fabric. However, there may not be sufficient leather available from the leather dye lot that had passed FAA regulations. As a result, a new dye lot must be re-burned to ensure compliance with the FAA standard, which adds further delay and cost of replacing a damaged headrest tube. An improved headrest that can be use a replacement headrest tube without removal of the upholstered fabric would be well received in the art.

BRIEF SUMMARY OF THE INVENTION

According to an aspect of the invention, a headrest assembly for an aircraft seat, includes a headrest frame having a body portion; a top member interconnected with the headrest frame, the top member including a plurality of elongated slots; a spring clip member interconnected with the top member; a bracket member with a locking rivet, the bracket member being coupled to the headrest frame; and a headrest tube having a longitudinal slot, where the headrest tube is configured to receive the locking rivet in the longitudinal slot and lock the headrest tube to the headrest frame in a locked position.

According to another aspect of the invention, a method for assembling a headrest for an aircraft includes coupling a headrest frame to a top member; coupling a spring clip member to the top member; fixedly attaching the spring clip member and the top member to the headrest frame with a plurality of rivets; attaching a bracket member to the headrest frame with at least one rivet; inserting a locking rivet into the bracket member; inserting a headrest tube into the bracket member; and locking the headrest tube to the headrest frame in a locked position.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

FIG. 5A is a partial front view of a headrest tube according to an embodiment of the invention;

FIG. 5B is a partial perspective view of the headrest tube of FIG. 5A according to an embodiment of the invention;

FIG. 5C is a side view of the headrest tube of FIG. 5A according to an embodiment of the invention;

FIG. 5D is a partial side view of the headrest tube of FIG. 5A according to an embodiment of the invention;

DETAILED DESCRIPTION OF THE INVENTION

Figure 1:
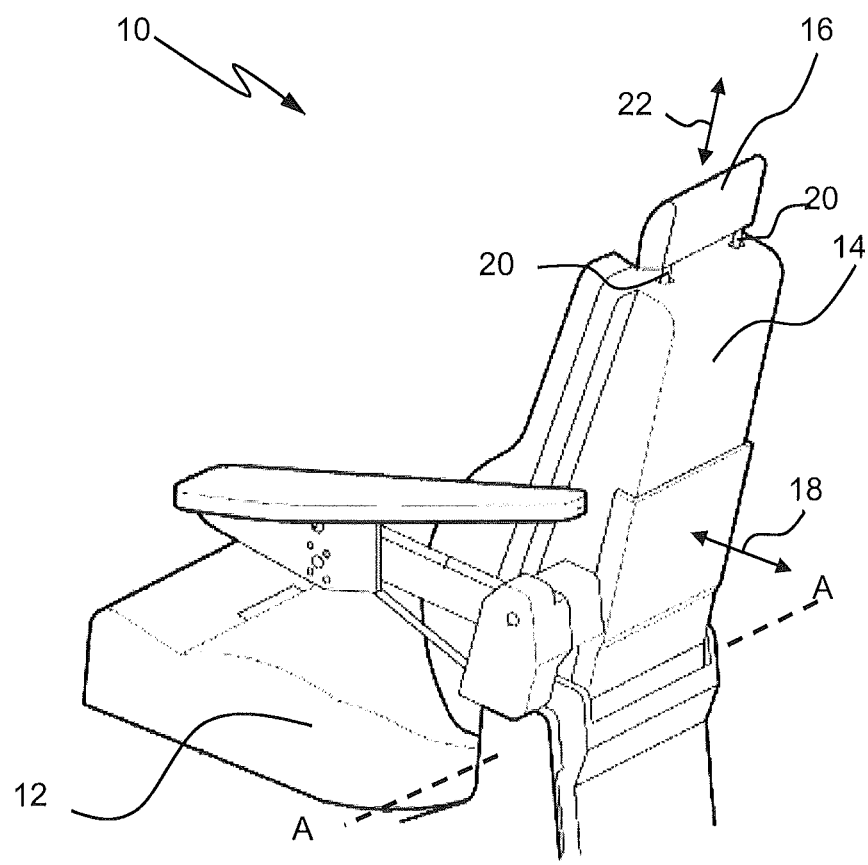
FIG. 1 is a perspective view of an aircraft seat with a headrest according to an embodiment of the invention.

Referring to the drawings, FIG. 1 illustrates an example aircraft seat 10 with an upholstered headrest 12 according to an embodiment of the invention. The aircraft seat 10 includes a seat 12, a seat back 14, and a selectively extending headrest 16. The seat 12 is pivotally coupled to the seat back 14 at axis A, which enables the seat back 14 to selectively pivot forward and back in the direction of arrow 18. Also, a headrest 16 is slidably connected to the seat back 14 through a plurality of substantially similar headrest tubes 20. The headrest 16 includes a headrest assembly 30 (See FIGS. 2A-2B) that is covered with foam and a fabric such as, e.g., leather or cloth during an upholstering process and is selectively coupled to a plurality of headrest tubes 20. Further, the headrest tubes 20 are selectively received in the seat back 14 through a plurality of conformally shaped holes aligned in direction of arrow 22. The headrest 16 may be selectively raised or lowered in the direction of arrow 22 via the headrest tubes 20. Although the headrest 16 is illustrated with the use of aircraft seat 10, it is to be understood that the headrest 16 may be used on other commercial seats, e.g. automobile seats or train seats, where the headrest 16 is selectively raised or lowered in order to adjust the sitting height of a person occupying the seat.

Figure 2A:
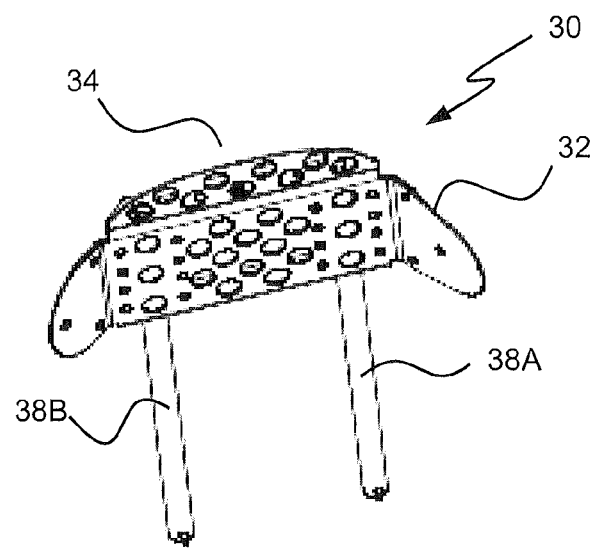
FIG. 2A is a top perspective view of a headrest assembly according to an embodiment of the invention.
Figure 2B:
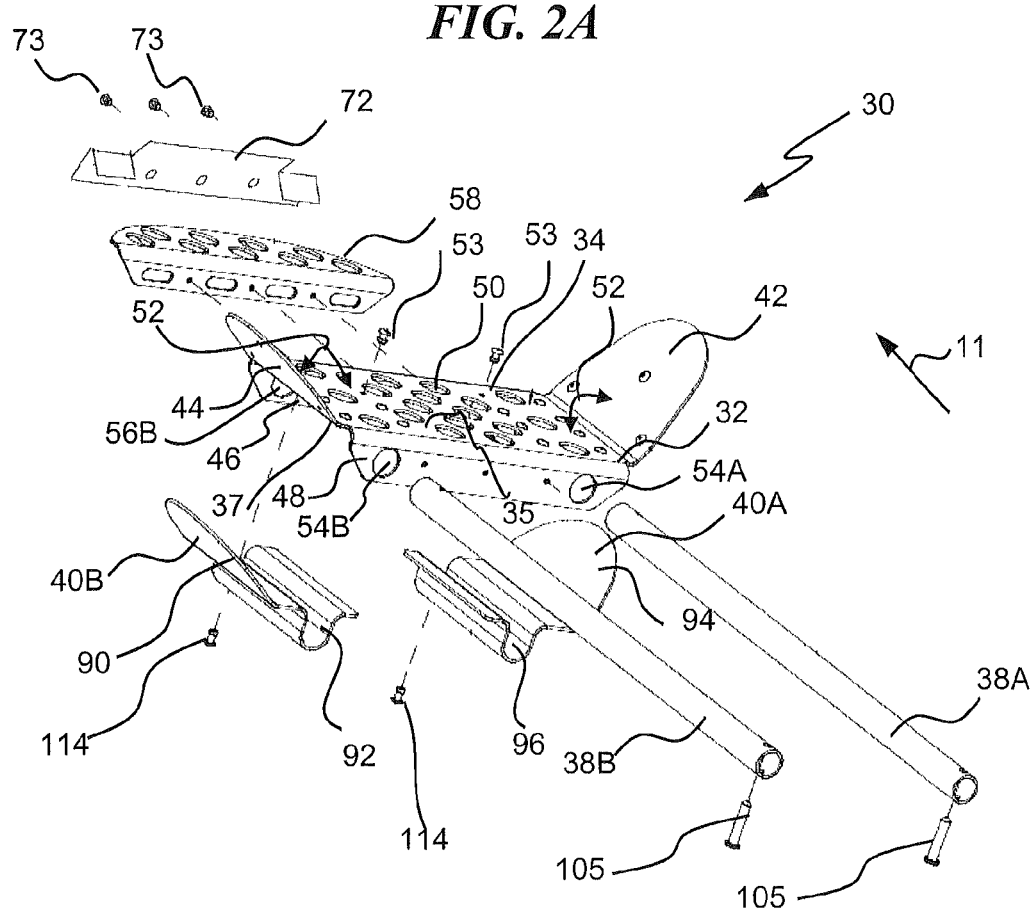
FIG. 2B is an exploded view of a headrest assembly of FIG. 2A according to an embodiment of the invention.

FIGS. 2A-2B depict a headrest assembly 30 for use in the headrest 12 (See FIG. 1) according to an embodiment of the invention. The headrest assembly 24 includes a headrest frame 32 that may be fixedly connected with rivets to a top member 58, to a spring clip member 72, and to a plurality of bracket members 40A-40B. Further, a plurality of headrest tubes 38A-38B may be selectively coupled and locked to the spring clip member 72 after assembly of the headrest assembly 30 as is shown and described below with reference to FIGS. 2B-5D.

The headrest frame 32 is formed from a generally unitary (or one-piece) metal sheet and includes a body portion 34, a first lateral wing portion 42, a second lateral wing portion 44, a top portion 46, and a bottom portion 48. The wing portions 42, 44, top portion 46, and bottom portion 48 are formed during assembly by bending the unitary metal sheet. In embodiments, the headrest frame 32 may be made of aluminum or aluminum alloy, but other suitable materials may also be used. The body portion 34 is generally planar and includes a plurality of substantially similar through-holes 50 stamped out from the body portion 34. The body portion 34 terminates laterally into a plurality of lateral wing portions 42, 44. The lateral wing portions 42, 44 extend laterally from body portion 32 and are tapered at an angle 52 to the body portion 34. In embodiments, the wing portions 42, 44 are provided to be resilient and flex when a force is applied to deflect each of the wing portion 42, 44 away from the body portion 34 such as, e.g., a force applied by a head of an occupant of aircraft seat 10. The body portion 34 terminates vertically into a top portion 46 and a bottom portion 48. The top portion 46 and the bottom portion 48 are orthogonal to the body portion 34. The top portion 46 has a pair of through-holes that are co-axially aligned with a pair of through-holes in the bottom portion 48. Particularly, hole 54B in bottom portion 48 is coaxially aligned with hole 56B in top portion 46 while hole 54A in bottom portion 48 is coaxially aligned with a similar through-hole (not visible in FIGS. 2A-2B) in top portion 46. The holes 56B, 54B in the respective top and bottom portions 46, 48 may selectively receive a plurality of headrest tubes 38A, 38B during fabrication of the headrest 16 (FIG. 1) as will be described in detail with further reference to FIGS. 4A-5D.

Figure 3A:
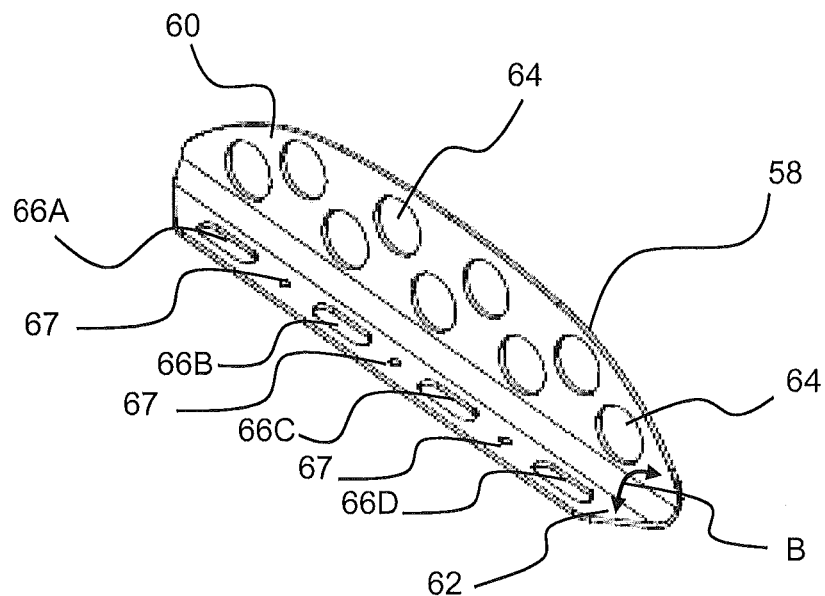
FIG. 3A is a top perspective view of a top member of a headrest assembly of FIG. 2A according to an embodiment of the invention.
Figure 3B:
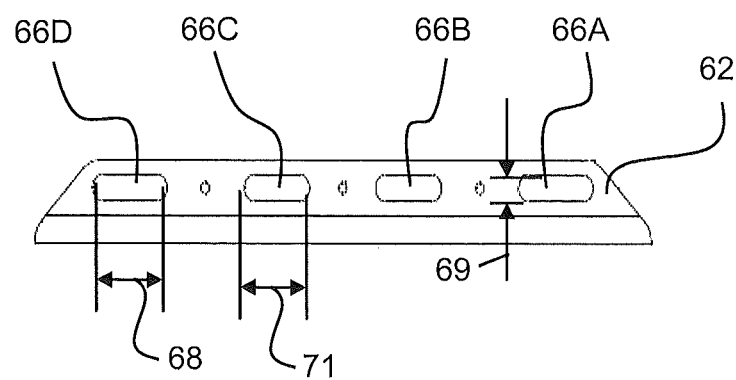
FIG. 3B is a top view of a top member of FIG. 3A according to an embodiment of the invention.

Referring to FIGS. 3A-3B, the top member 58 may also be formed from a generally unitary metal sheet and includes a first portion 60 and a second portion 62. The first portion 60 is generally planar and includes a plurality of substantially similar circular through-holes 64. Also, the first portion 60 terminates into a second portion 62. The second portion 62 is also generally planar and is at an angle B with the first portion 60 and is formed during assembly by bending top member 58. In an embodiment, angle B is 90 degrees. However, in embodiments, angle B may be any angle. Also, the second portion 62 includes a plurality of elongated slots 66A-66D that traverse a longitudinal length of the second portion 62. The elongated slots 66A-66D have a length 69. In an embodiment, the elongated slots 66A and 66D are substantially similar and have a length 68 that may be longer than a length 71 of the other elongated slots 66B and 66C. The elongated slots 66A and 66D are provided to receive tabs 82, 84 of spring clip member 72 (See FIGS. 4A-4C) in order to lock the headrest tubes 38A-38B (See FIG. 2B) to spring clip member 72 during assembly as will be described below.

Figure 4A:
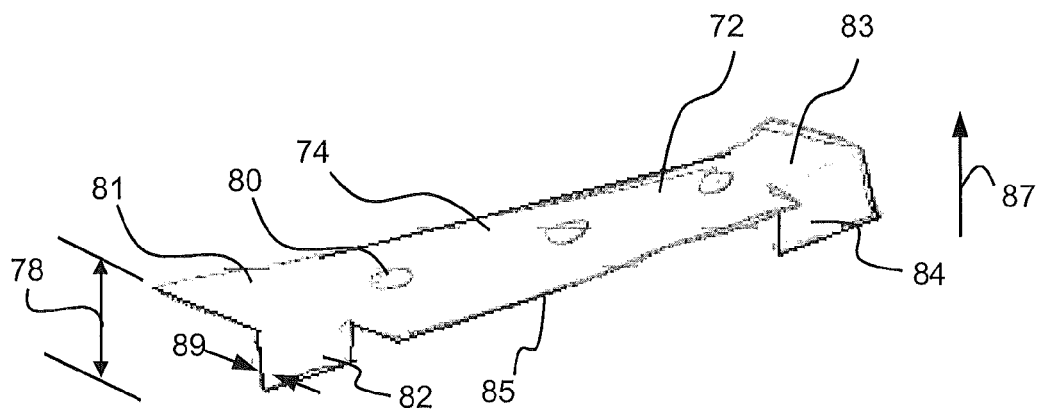
FIG. 4A is a front perspective view of a spring clip member of a headrest assembly of FIG. 2A according to an embodiment of the invention.
Figure 4B:
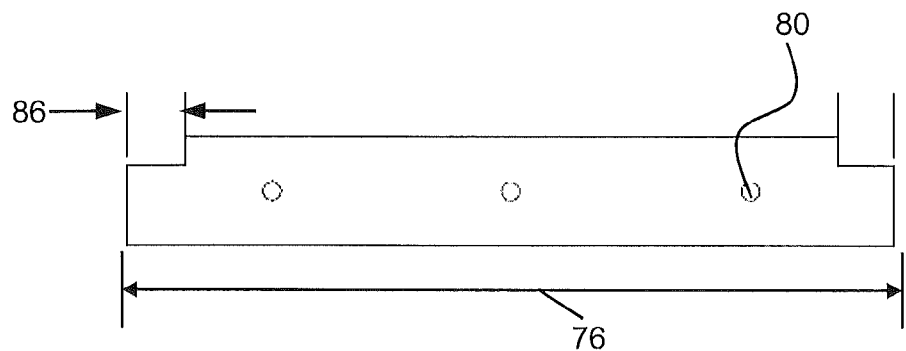
FIG. 4B is a top view of the spring clip member of FIG. 4A according to an embodiment of the invention.
Figure 4C:
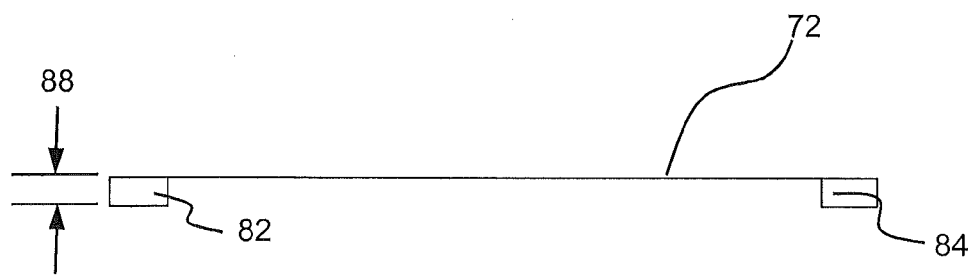
FIG. 4C is a front view of the spring clip member of FIG. 4A according to an embodiment of the invention.
Figure 6A:
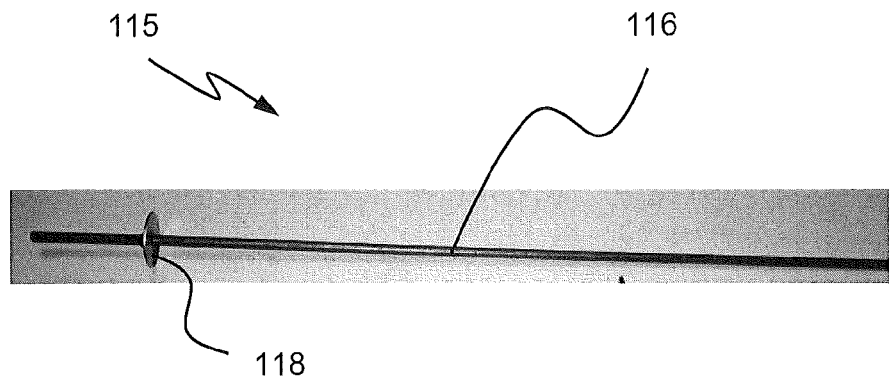
FIG. 6A is a side perspective view of a headrest tube removal tool for use with the headrest of FIG. 1 according to an embodiment of the invention.
Figure 6B:
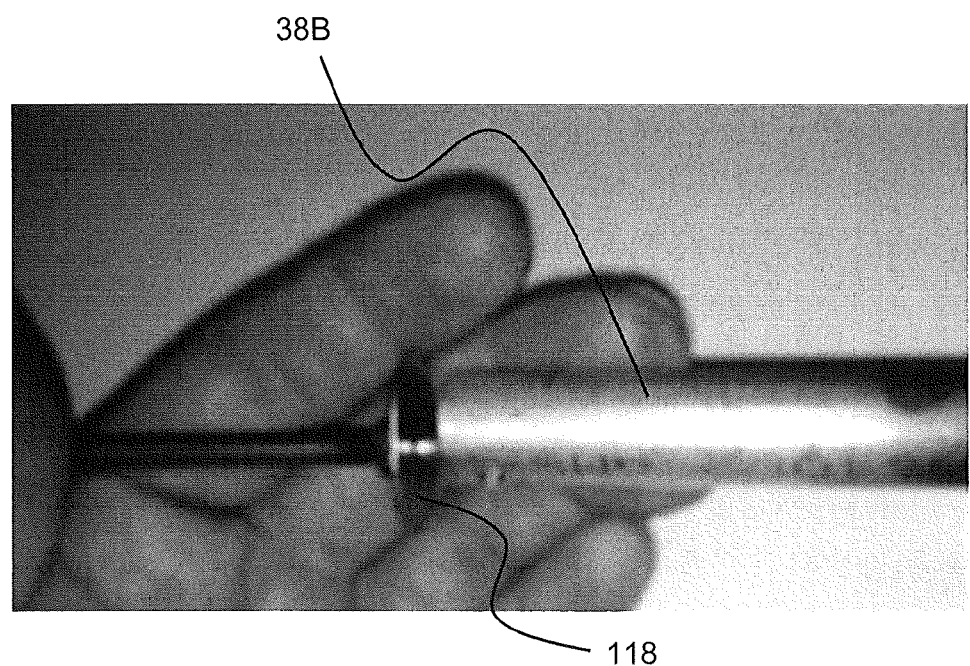
FIG. 6B is a partial perspective view of the headrest tube removal tool of FIG. 6A but shown inserted into the headrest tube of FIG. 2A according to an embodiment of the invention.

Referring to FIGS. 4A-4C, the spring clip member 72 has a generally planar body portion 74 with a length 76 and a height 78. The body portion 74 has a plurality of substantially similar through-apertures 80 that are configured to receive complementary shaped rivets. Also, the spring clip member 72 includes a plurality of tabs 82, 84 that are provided at either end of the body portion 74. The tabs 82, 84 are substantially similar and are generally orthogonal to the body portion 74. The tabs 82, 84 have a length 86, a height 88, and thickness 89. Each tab 82, 84 is configured to be received in the respective slots 66A, 66D (see FIG. 3B) and engage a slot formed in an end of a respective headrest tube 38A, 38B (see FIG. 2B) after the headrest tube 38A, 38B is inserted into the headrest frame 32, as will be described below. The tabs 82, 84 are formed by cutting away a portion of the body portion 74 to form spring portions 81, 83. The spring portions 81, 83 may be selectively deflected from the body portion 74 along direction of arrow 87. The deflection may be applied by a force to a bottom surface 85 along direction of arrow 87 in the vicinity of spring portions 81, 83. In an embodiment, the spring clip member 72 may be formed from a unitary metal sheet of spring steel. But, other similar materials may be utilized without departing from the scope of the invention.

Referring back to FIGS. 2A-2B, bracket members 40A-40B are substantially similar and are generally arcuate in shape. Bracket member 40A includes a wing portion 90 and a channel or groove 92 that traverses a longitudinal length of bracket member 40A. The wing portion 90 is configured to interface with the wing portion 44 of headrest frame 32 while channel 92 is provided to receive the headrest tube 38B. Also, bracket member 40B includes a wing portion 94 and a channel or grove 96 that traverses a longitudinal length of the bracket member 40B. The wing portion 94 is configured to engage the wing portion 42 of headrest frame 32 while channel 96 is provided to receive the headrest tube 38A in an assembled headrest 16.

Referring to FIGS. 5A-5D, an example of a headrest tube 38B is illustrated. It is to be appreciated that the headrest tubes 38A and 38B are substantially similar and a description of headrest tube 38B provides an adequate description for the headrest tube 38A. As illustrated, headrest tube 38B is tubular and may be thin-walled and has a length 104 from a proximal end 100 and a distal end 102. The headrest tube 38B includes a bore with an internal diameter 111 from proximal end 100 to distal end 102. The proximal end 100 is provided to be received in the plurality of holes 54B, 56B (See FIG. 2B) and engage the spring clip member 72. The distal end 102 includes a hole 103 that is configured to receive a conformally shaped pin 105 (See FIG. 2B). Also, the proximal end 100 includes a first elongated slot 106 having a width 110 and which traverses a longitudinal length 107 of headrest tube 38B. The first slot 106 terminates into a second elongated slot 108 having a width 112. The second slot 108 traverses a circumferential length 109 of the headrest tube 38B. In an embodiment, the widths 110, 112 are sized to engage a width of a "squeezed" locking rivet 114 (See FIG. 2B) that is inserted into and locks the headrest tube 38B in the headrest frame 32 (See FIG. 2B) during assembly of the headrest 16. In embodiments, the length 104 is about 13.490 inch (34.26 centimeter) to about 13.510 inch (34.32 centimeter), internal diameter 111 is about 0.365 inch (0.93 centimeter) to about 0.385 inch (0.98 centimeter), width 110 is about 0.150 inch (0.38 centimeter) to about 0.170 inch (0.43 centimeter), and width 112 is about 0.170 inch (0.43 centimeter) to about 0.150 inch (0.38 centimeter).

With reference to FIG. 1-FIG. 5D, the headrest 16 may be assembled from the headrest assembly 30 by selectively connecting the headrest frame 32 to the top member 58, spring clip member 72, and bracket members 40A-40B. Particularly, the top portion 46 (FIG. 2A) of headrest frame 32 is connected to the top member 58 along second portion 62 (See FIG. 3A) such that the first portion 60 of top member 58 is generally planar with body portion 34 (See FIG. 2B). Further, the spring clip member 72 is connected to the second portion 62 of top member 58 such that tab 82 (FIG. 4A) resides within the elongated slot 66D (See FIG. 3A) of top member 58 and tab 84 resides within the elongated slot 66A (See FIG. 3A) of top member 58. The headrest frame 32, top member 58, and spring clip member 72 are fixedly coupled together by inserting a plurality of rivets 73 into conformally shaped holes 80 of spring clip member 72 (See FIG. 4A), holes 67 of top member 58 (See FIG. 3A), and holes (not shown) in top portion 46 of headrest frame 32. Next, the bracket members 40A-40B (See FIG. 2B) are fixedly coupled to the headrest frame 32 by connecting the bracket members 40A-40B to the bottom surface 37 and inserting rivets 53 into conformally shaped holes through the top surface 35 and through respective holes in the bracket members 40A-40B. Further, rivets 114 are inserted into the bracket members 40A-40B and into the channels 90, 96 without the headrest tubes 38A-38B being inserted into the bracket members 40A-40B. The partially assembled headrest frame 32 including the top member 58, clip member 72, and bracket members 40A, 40B is upholstered with foam and fabric such as, e.g., leather and glue may be applied to form a partially upholstered headrest assembly. Next, further assembly of the headrest 16 (See FIG. 1) includes inserting each headrest tube 38A, 38B into the respective holes 54A, 54B of headrest frame 32. The headrest tubes 38A, 38B are inserted into the channels 96, 94 of the respective bracket members 40A, 40B. The headrest tubes 38A, 38B engage the rivets 114 (FIG. 2B) within the first slot 106 (See FIG. 5B). As the headrest tubes 38A, 38B slide further into the headrest frame 32, they engage the spring portions 81, 83 and respective tabs 82, 84 of the spring clip member 72 causing the spring portions 81, 83 and tabs 82, 84 to deflect away from the top member 58 in the direction of arrow 11 (See FIG. 2B). As the headrest tubes 38A, 38B are further twisted about 90 degrees clockwise, the slot 108 engages the locking rivet 114 (See FIG. 2B) and locks the headrest tube 38A, 38B in the headrest frame 32. Further, the tabs 82, 84 slide into the slot 108 and prevent the headrest tubes 38A, 38B from rotating counter-clockwise 90 degrees and out of engagement with the headrest frame 32. Further, the spring clip member 72 applies a reactionary and compressive force through spring portions 81, 83 and further enables the headrest tube 38A, 38B to be in locked engagement with the headrest frame 32.

With reference to FIGS. 1, 5A, and 6A-6B, a damaged headrest tube such as, e.g. headrest tube 38B may be removed from headrest 16 by using a headrest tool removal tool 115 and inserting a conformally sized metal rod 116 into distal end 102 of headrest tube 38B. In an embodiment, the metal rod 116 may be a steel rod, however, in embodiments, aluminum, aluminum alloy, etc. may also be used and a diameter of metal rod 116 is sized to be smaller that width 69 of elongated slots 66A, 66D (See FIG. 3B) and thickness 89 of tab 82 (See FIG. 4A) in order to traverse slots 66A, 66D and deflect spring portions 81, 83. The headrest tool removal tool 115 includes a stopping member 118 fixedly attached to the metal rod 116. The stopping member 118 has a diameter that is larger than an internal diameter of a distal end 102 of headrest tube 38B. The stopping member 118 regulates how far the metal rod 116 is inserted to deflect portion 83 (See FIG. 4A) of the spring clip member 72 when it abuts a distal end 102 and prevents the headrest tube removal tube 115 from traveling beyond the stopping member 118. The metal rod 116 is inserted into the headrest tube 38B until the stopping member 118 contacts the distal end 102. While the stopping member 118 contacts the distal end 102, the portion 83 of the spring clip member 72 is deflected in the direction of arrow 11 (See FIG. 2B). Once the spring clip member 72 is deflected, the headrest tube 38B is free to rotate. The headrest tube 38B is rotated counter-clockwise by about 90° over the locking rivet 114 to disengage the headrest tube 38B from the locking rivet 114. Once the headrest tube 38B is disengaged, the headrest tube 38B may be removed from the headrest 16 and a new headrest tube substantially similar may be inserted into its place. As will be appreciated by those of skill in the art, the assembly process of headrest 16 is susceptible to a wide array of alternatives. Thus, it is contemplated that any number of other procedures and practices may likewise be utilized such as, for example, by utilizing screws, pins, or the like.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Further, while described in the context of the manufacture of parts for a helicopter, it is understood that aspects can be used in other contexts in which a coating is to be selectively disposed on a surface, such as in semiconductor manufacturing. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. A headrest assembly for an aircraft seat, comprising:
   a headrest frame having a body portion;
   a top member interconnected with the headrest frame, the top member including a plurality of elongated slots;
   a spring clip member interconnected with the top member;
   a bracket member with a locking rivet, the bracket member being coupled to the headrest frame; and
   a headrest tube having a longitudinal slot;
   wherein the headrest tube is configured to receive the locking rivet in the longitudinal slot in a locked position and thereby lock the headrest tube to the headrest frame;
   wherein the spring clip member comprises a planar body portion and a spring portion includes a tab member that is orthogonal to the body portion located on either end of the body portion.

2. The headrest assembly of claim 1, wherein the spring clip member is configured to be coupled to the top member along the planar body portion.

3. The headrest assembly of claim 1, wherein the headrest tube is configured to abut the tab member in the longitudinal slot in the locked position.

4. The headrest assembly of claim 1, wherein the tab member is configured to engage an elongated slot in the top member.

5. The headrest assembly of claim 1, wherein the bracket member further comprises a channel formed along a longitudinal length of the bracket member, wherein the channel is configured to receive the headrest tube.

6. The headrest assembly of claim 1, wherein the top member further comprises a first portion and a second portion that includes the plurality of elongated slots, wherein the second portion is configured to be coupled to the headrest frame.

7. A headrest assembly for an aircraft seat, comprising:
a headrest frame having a body portion;
a top member interconnected with the headrest frame, the top member including a plurality of elongated slots;
a spring clip member interconnected with the top member;
a bracket member with a locking rivet, the bracket member being coupled to the headrest frame; and
a headrest tube having a longitudinal slot;
wherein the headrest tube is configured to receive the locking rivet in the longitudinal slot in a locked position and thereby lock the headrest tube to the headrest frame;
wherein the headrest frame further comprises;
a top portion with a first pair of holes; and
a bottom portion with a second pair of holes;
wherein each hole in the first pair of holes is aligned with a corresponding hole in the second pair of holes wherein the aligned first and second pair of holes are configured to receive the headrest tube.

8. A method for assembling a headrest for an aircraft, comprising:
coupling a headrest frame to a top member;
coupling a spring clip member to the top member;
fixedly attaching the spring clip member and the top member to the headrest frame with a plurality of rivets;
attaching a bracket member to the headrest frame with at least one rivet;
inserting a locking rivet into the bracket member;
inserting a headrest tube into the bracket member;
locking the headrest tube to the headrest frame in a locked position;
receiving a tab in the longitudinal slot in the locked position, wherein the tab is located on an end of the spring clip member.

9. The method of claim 8, wherein the locking of the headrest tube further comprises inserting the locking rivet into a longitudinal slot in the headrest tube.

10. The method of claim 8, further comprising deflecting a spring portion with the headrest tube, wherein the spring portion being located on an end of the spring clip member.

11. The method of claim 8, further comprising inserting the headrest tube into a channel formed in the bracket member.

* * * * *